United States Patent
Magnusson

(10) Patent No.: US 8,849,546 B2
(45) Date of Patent: Sep. 30, 2014

(54) METHOD FOR SELECTING BETWEEN TWO OPERATION MODES IN A DUAL FUEL INTERNAL COMBUSTION ENGINE OF THE DIESEL-TYPE AND A DUAL FUEL INTERNAL COMBUSTION ENGINE OF THE DIESEL-TYPE OPERABLE ACCORDING TO SUCH METHOD

(75) Inventor: Ingemar Magnusson, Göteborg (SE)

(73) Assignee: Volvo Technology Corporation, Göteborg (SE)

( * ) Notice: Subject to any disclaimer, the term of this patent is extended or adjusted under 35 U.S.C. 154(b) by 473 days.

(21) Appl. No.: 13/381,955

(22) PCT Filed: Jul. 3, 2009

(86) PCT No.: PCT/SE2009/000350
§ 371 (c)(1),
(2), (4) Date: Feb. 16, 2012

(87) PCT Pub. No.: WO2011/002351
PCT Pub. Date: Jan. 6, 2011

(65) Prior Publication Data
US 2012/0136556 A1    May 31, 2012

(51) Int. Cl.
*F02D 41/30* (2006.01)
*F02D 19/06* (2006.01)
*F02D 19/10* (2006.01)
*F02D 41/00* (2006.01)

(52) U.S. Cl.
CPC .............. *F02D 19/10* (2013.01); *F02D 19/061* (2013.01); *Y02T 10/128* (2013.01); *F02D 41/3029* (2013.01); *F02D 41/0025* (2013.01); *Y02T 10/36* (2013.01); *F02D 19/0652* (2013.01); *F02D 41/3035* (2013.01)
USPC ............................ 701/104; 123/1 A; 123/299

(58) Field of Classification Search
USPC ............ 701/103–105; 123/1 A, 27 GE, 27 R, 123/295, 299–305, 431, 488, 525, 575–577
See application file for complete search history.

(56) References Cited

U.S. PATENT DOCUMENTS

| | | | |
|---|---|---|---|
| 6,561,157 B2* | 5/2003 | zur Loye et al. | 123/295 |
| 2002/0157619 A1 | 10/2002 | Gray | |

(Continued)

*Primary Examiner* — John Kwon
*Assistant Examiner* — Johnny H Hoang
(74) *Attorney, Agent, or Firm* — WRB-IP LLP

(57) ABSTRACT

A method of selecting between two operation modes in a dual fuel internal combustion engine of the diesel-type is provided. The engine includes a combustion chamber at least partly delimited by a piston, a first fuel supply for a first fuel, the first fuel supply being located in or at the combustion chamber and/or in or at an inlet port thereof, and a second fuel supply for a second fuel. The engine has two different operation modes, both operation modes including the steps of pre-mixing the first fuel in the combustion chamber and/or in the inlet port, compressing the charge containing the first fuel to conditions that allow auto-ignition of the second fuel, performing a first injection of the second fuel into the combustion chamber to initiate auto-ignition of the second fuel, thereby initiating conditions for combustion of the fuel remaining in the combustion chamber after auto-ignition of the second fuel. The first operation mode is distinguished by homogeneous ignition and combustion of the remaining fuel. The second operation mode is distinguished by pre-mixed flame propagation combustion of the remaining fuel. The method includes adjusting the amount of the second fuel injected in the first injection of the second fuel, and/or the timing of the first injection of the second fuel, so as to control the combustion chamber temperature and pressure after auto-ignition of the second fuel such that selection between the first and second operation modes is achieved. A dual fuel internal combustion engine of the diesel-type is also provided.

14 Claims, 3 Drawing Sheets

(56) References Cited

U.S. PATENT DOCUMENTS

| | | |
|---|---|---|
| 2002/0166515 A1 | 11/2002 | Ancimer et al. |
| 2004/0149255 A1 | 8/2004 | Zur Loye et al. |
| 2005/0224044 A1* | 10/2005 | Stojkovic et al. ............. 123/299 |

* cited by examiner

METHOD FOR SELECTING BETWEEN TWO OPERATION MODES IN A DUAL FUEL INTERNAL COMBUSTION ENGINE OF THE DIESEL-TYPE AND A DUAL FUEL INTERNAL COMBUSTION ENGINE OF THE DIESEL-TYPE OPERABLE ACCORDING TO SUCH METHOD

BACKGROUND AND SUMMARY

This invention relates to a method of selecting between two operation modes in a dual fuel internal combustion engine of the diesel-type, and to a dual fuel internal combustion engine of the diesel-type operable according to such method.

Dual fuel internal combustion engines of the diesel-type usually comprise a combustion chamber being at least partly delimited by a piston, a first fuel supply for a first fuel, said first fuel supply being located in the combustion chamber or in an inlet port thereof, and a second fuel supply for a second fuel.

A known method to operate internal combustion engines as described above comprises the steps of:

pre-mixing said first fuel in said combustion chamber and/or in said inlet port;

compressing the charge containing the first fuel to conditions close to Homogeneous Charge Compression Ignition (HCCI) of said first fuel; and injecting a second fuel into said combustion chamber to initiate auto-ignition of said second fuel and subsequently said first fuel.

Such a method may generally be described as an operation mode distinguished by homogeneous ignition and combustion of the remaining fuel. For briefness, in the following such a method will also be referred to as a "homogeneous combustion mode".

Another known method to operate internal combustion engines as described above comprises the steps of:

Pre-mixing said first fuel in said combustion chamber and/or in said inlet port;

igniting said first fuel in said combustion chamber by injection and auto-ignition of a second fuel to thereby initiate conditions for pre-mixed flame propagation combustion.

Such a method may generally be described as an operation mode distinguished by pre-mixed flame propagation combustion. For briefness, in the following such a method will also be referred to as a "flame propagation mode".

Different modes of operation of the internal combustion engines present different advantages. There is therefore a need to provide a method for enabling various operation modes to be carried out in an internal combustion engine of the diesel-type.

In view of the above, it will be understood that there is also a need for a dual fuel internal combustion engine of the diesel-type for carrying out a method as desired above.

In accordance with an aspect of the invention there is provided a method of selecting between two operation modes in a dual fuel internal combustion engine of the diesel-type, comprising a combustion chamber being at least partly delimited by a piston, a first fuel supply for a first fuel, said first fuel supply being located in or at the combustion chamber and/or in or at an inlet port thereof, and a second fuel supply for a second fuel, the engine having two different operation modes, both operation modes comprising the steps of:

pre-mixing said first fuel in said combustion chamber and/or in said inlet port,—compressing the charge containing the first fuel to conditions that allow auto-ignition of the second fuel, performing a first injection of the second fuel into said combustion chamber to initiate auto-ignition of said second fuel, thereby initiating conditions for combustion of the fuel remaining in the combustion chamber after auto-ignition of the second fuel, wherein said first operation mode is distinguished by homogeneous ignition and combustion of the remaining fuel, said second operation mode is distinguished by pre-mixed flame propagation combustion of the remaining fuel, said method further comprising the step of:

adjusting the amount of the second fuel injected in said first injection of the second fuel, and/or the timing of said first injection of the second fuel, so as to control the combustion chamber temperature and pressure after auto-ignition of the second fuel such that selection between said first and second operation modes is achieved.

Advantageously, said first fuel is pre-mixed for instance with air and/or recycled exhaust gas, to form the charge containing the first fuel.

The method using the first operation mode is characterised by homogeneous ignition and combustion of the remaining fuel. For briefness, in the following such a method will also be referred to as a "homogeneous combustion mode".

The method using the second operation mode is characterised by pre-mixed flame propagation combustion of the remaining fuel. For briefness, in the following such a method will also be referred to as a "flame propagation mode".

In the proposed method, both operation modes may occur in the combustion chamber of the engine. For selecting between the two operation modes, it has been found that the amount of fuel in the first injection of the second fuel may be used so as to control the combustion chamber temperature and pressure after auto-ignition of the second fuel. The temperature and pressure in the combustion chamber will affect which one of the first and the second operation modes that will prevail in the combustion chamber. Hence, a switch between the first and the second operation modes may be achieved by varying the amount of the second fuel injected in said first injection.

Selection of said first operation mode may be performed for instance by increasing the amount of fuel in said first injection of the second fuel and thereby increasing the temperature and pressure in the combustion chamber after auto-ignition of the second fuel. Hence, increasing the amount of second fuel in said first injection may be performed in order to switch from the second operation mode to the first operation mode. Moreover, further increasing the amount of the second fuel injected in said first injection may be performed in order to move an already prevailing first operation mode to operation parameters being farther from the switching point. Preferably, the amount or quantity of the first injection of the second fuel in said first injection is controlled by using a device for determining the desired operation mode.

Preferably, the amount of the second fuel injected in said first injection of the second fuel may be above a predetermined threshold amount for selecting said first operation mode.

Selection of said second operation mode may be performed for instance by decreasing the amount of fuel in said first injection of a second fuel. Hence, decreasing the amount of second fuel in said first injection may be performed in order to switch from the first operation mode to the second operation mode. Moreover, further decreasing the amount of the second fuel injected in said first injection may be performed in order to move an already prevailing second operation mode to operation parameters being farther from the switching point. Preferably, the amount or quantity of the first injection of the second fuel in said first injection is controlled by using a device for determining the desired operation mode.

Preferably, the amount of the second fuel injected in said first injection of the second fuel may be below a predetermined threshold amount for selecting said second operation mode.

Alternatively or in combination with variations of the amount of the second fuel injected in a first injection of the second fuel, the timing (i.e. the point in time when injection starts and the duration of the injection) of the first injection of the second fuel can be varied to select one of the two operation modes. A selection of the first operation mode can be made by arranging (i.e. by selecting the timing of injection) the auto-ignition of the second fuel to occur when the piston of the engine is close to a top dead position. A selection of the second operation mode can be made by arranging the auto-ignition of the second fuel to occur when the piston of the engine is farther from a top dead position.

The switching between said first and second modes may advantageously be performed by controlling the amount of second fuel injected, and/or the timing of the injection of the second fuel, when the lambda value (normalised air/fuel ratio) in the combustion chamber is between 1 and 3, preferably between 1.5 and 2.5, most preferably approximately 2.

Preferably, the first fuel is a fuel with high octane number, preferably greater than 90.

Advantageously, the first fuel is a gaseous fuel, preferably natural gas or biogas.

Preferably, the second fuel is a fuel with high cetane number, preferably greater than 40. Advantageously, said second fuel is a liquid fuel, preferably diesel oil, bio-diesel or DME (dimethyl ether).

Advantageously, said first fuel is pre-mixed for instance with air and/or recycled exhaust gas.

In a second aspect of the invention there is provided a dual fuel internal combustion engine of the diesel-type comprising:

a combustion chamber, being at least partly delimited by a piston, a first fuel supply for a first fuel, said first fuel supply being located in or at the combustion chamber and/or in or at an inlet port thereof, a second fuel supply for a second fuel, said first fuel being pre-mixed in said combustion chamber and/or said inlet port, at least one device for compressing the charge containing the first fuel to conditions that allow auto-ignition of the second fuel, at least one injector device for performing a first injection of the second fuel into said combustion chamber to initiate auto-ignition of said second fuel, thereby initiating conditions for combustion of the fuel remaining in the combustion chamber after auto-ignition of the second fuel, wherein said first operation mode is distinguished by homogeneous ignition and combustion of the remaining fuel, said second operation mode is distinguished by pre-mixed flame propagation combustion of the remaining fuel.

The dual fuel internal combustion engine comprises further at least one injector device for adjusting the amount of the second fuel injected in said first injection of the second fuel, and/or the timing of said first injection of the second fuel, so as to control the combustion chamber temperature and pressure after auto-ignition of the second fuel such that selection between said first and second operation modes is achieved. In applying this principle, it is possible to switch between said first and second operation modes of such a dual fuel internal combustion engine.

In a preferred embodiment of the dual fuel internal combustion engine of the diesel-type according to an aspect of the invention, the at least one injector device for performing of the first injection of the second fuel is adapted to in the first operation mode of said engine, performing said first injection of the second fuel into said combustion chamber to initiate auto-ignition of said second fuel and subsequently said first fuel in said combustion chamber, thereby initiating conditions for homogeneous ignition and combustion of the first fuel, and in the second operation mode of said engine, performing said first injection of the second fuel into said combustion chamber to initiate auto-ignition of said second fuel for igniting said first fuel in said combustion chamber, thereby initiating conditions for pre-mixed flame propagation combustion of the first fuel.

Auto-ignition typically occurs soon after the start of injection of the second fuel. Initially, a fraction of the second fuel auto-ignites, and generally a substantial amount of the second fuel is combusted before auto-ignition of the first fuel starts. Hence, the term "subsequently" used above relates to the start of the auto-ignition process and does not exclude that a portion of the auto-ignition of the first and of the second fuel, respectively, may take place in parallel. Typically, a first portion of the second fuel is combusted before auto-ignition of the first fuel starts and then the remaining second portion of the second fuel is combusted in parallel to the combustion of the first fuel.

It will be understood that features and advantages as described above in relation to the method are equally applicable to the dual fuel internal combustion engine in accordance with aspects the invention.

First Mode of Operation

Returning to the first operation mode of the engine, a preferred embodiment of said first operation mode will be described in the following.

The first operation mode of the engine may advantageously comprise a method of operating a dual fuel internal combustion engine of the diesel-type, comprising a combustion chamber being at least partly delimited by a piston, a first fuel supply for a first fuel, said first fuel supply being located in or at the combustion chamber and/or in or at an inlet port thereof, and a second fuel supply for a second fuel, the method comprising the steps of:

pre-mixing said first fuel in said combustion chamber and/or in said inlet port, compressing the charge containing the first fuel to conditions close to homogeneous charge compression ignition of said first fuel, performing a first injection of the second fuel into said combustion chamber to initiate auto-ignition of said second fuel and subsequently said first fuel.

Further, the first operation mode may advantageously comprise the step of:

performing at least one subsequent, preferably liquid, injection, said subsequent injection supplying additional kinetic energy into the combustion process to thereby enhance late mixing in the combustion chamber, so as to improve late oxidation during combustion.

The additional kinetic energy provided by the subsequent injection (or subsequent injections) is preferably supplied in later stages of the combustion cycle so as to enhance global and local mixing for improved late oxidation.

The subsequent injection (or subsequent injections) enhances combustion in low temperature regions of the combustion chamber, such as close to the walls thereof, by improving the mixing between low and high temperature regions. Accordingly, the combustion is improved leading to better fuel efficiency and less emission.

The first injection of the second fuel into the combustion chamber is sufficient to initiate auto-ignition of the first fuel. In contrast, the purpose of the subsequent injection (or subsequent injections) (after said first injection of second fuel) is to add kinetic energy creating increased mixing in the combustion chamber. Accordingly, the subsequent injections need not necessarily add any fuel to the combustion process. Any gaseous or liquid matter, which may transfer kinetic energy via an injection thereof and which does not disturb the combustion process, may be used.

It is preferred to inject a liquid for the subsequent injections, since the necessary quantity of supplied kinetic energy and the administration of the injections may generally be easier to achieve with liquids than with injection of gaseous matter. In view of the above, any liquid which does not disturb the combustion process could be injected, such as e.g. water. It is to be understood however, that with injection of a liquid is meant that the substance is in its liquid phase at the precise moment of injection. Once injected, the liquid will, for typical conditions, transfer to gaseous phase with a rate depending on the combustion chamber conditions, the injection process and the properties of the liquid. Hence, even when the subsequent injections are liquid injections, a large fraction of the kinetic energy is transferred and a large fraction of the turbulence is created by impact of the injected substance while in its gaseous phase.

However, for practical purposes, it is preferred that the at least one subsequent injection is an injection of a fuel. Most preferred, the subsequent liquid injection is of the same fuel as the first injection, that is, of the second fuel. As such, no additional constructive or engine design arrangements for the subsequent injections are necessary.

Preferably, the amount of additional kinetic energy supplied by the at least one subsequent injection is variable.

As mentioned above, it is envisaged to use a combustion cycle comprising at least one subsequent injection, but several subsequent injections may also be used.

Advantageously, the amount of additional kinetic energy supplied by these subsequent injections is variable by varying at least one of the number of subsequent injections, the injection pressures of the subsequent injections, the durations of the subsequent injections, or the dwell time between subsequent injections. In this context it is to be understood that the amount of additional kinetic energy supplied may be varied between subsequent injections of the same combustion cycle, and/or be varied between subsequent injections belonging to different combustion cycles.

Advantageously, the amount of kinetic energy supplied by these subsequent injections is varied in accordance with feedback supplied from at least one sensor sensing at least one of: the combustion process, the fuels and their parameters as temperature, pressure, time, quality of fuel, etc. and/or the results of said combustion process including but not limited to the resulting chemical compounds produced by such combustion process and contained in the exhaust gas of the engine. The control of the at least one subsequent injection may then be performed using feedback from said sensor as input. Accordingly, the combustion process may be continuously surveyed and the subsequent injections continuously controlled to improve said combustion process. Advantageously, in a start-up phase a first combustion cycle or a first few combustion cycles may be run using selected start parameters for the subsequent injection, whereafter the sensor is used for evaluating said first combustion cycle or the first few combustion cycles, and providing input for the adjustment of the subsequent injection for the following combustion cycles in the normal operational phase of the engine. Accordingly, the combustion process may be adapted for a specific situation. Moreover, this enables a more robust combustion process, since the subsequent injections may also be adapted if the conditions should vary during continuous operation of the engine.

As an alternative to initiating the first combustion cycle or the first few combustion cycles with selected start parameters for the subsequent injection (or subsequent injections), in the start-up phase the first combustion cycle or the first few combustion cycles could be run without any subsequent injection at all.

The sensor(s) may advantageously be sensor(s) for sensing for instance CO or HC concentrations in the engine exhaust gas.

Alternatively, in addition or in combination with one or more CO or HC sensors, the method may use a sensor for sensing the quality of the combustion. Various such sensors may be applicable. Preferably, a device for sensing the combustion chamber pressure could be used in combination with a method for a fast evaluation (on a cycle-to-cycle basis) of the heat release.

In a second aspect of the invention, concerning the first operation mode, there may advantageously be provided a dual fuel internal combustion engine of the diesel-type comprising:

a combustion chamber being at least partly delimited by a piston, a first fuel supply for a first fuel, said first fuel supply being located in or at the combustion chamber and/or in or at an inlet port thereof, a second fuel supply for a second fuel, said first fuel being pre-mixed in said combustion chamber and/or said inlet port, at least one device for compressing the charge containing the first fuel to conditions close to homogeneous charge compression ignition of said first fuel, at least one injector device for performing a first injection of the second fuel into said combustion chamber to initiate auto-ignition of said second fuel and subsequently said first fuel.

Advantageously, the dual fuel internal combustion engine further comprises at least one injector device for performing at least one subsequent preferably liquid, injection, so as to supply additional kinetic energy into the combustion process to thereby enhance late mixing in the combustion chamber, so as to improve late oxidation during combustion.

Preferably, the dual fuel combustion engine comprises at least one sensor for determining the operation mode, wherein output from said sensor is used to control the amount or quantity of the first injection of the second fuel, and/or the timing of said first injection of the second fuel.

Preferably, the dual fuel combustion engine comprises at least one sensor for providing feedback from the combustion process, wherein the output from said sensor is used for said control of the at least one subsequent (preferably liquid) injection.

Preferably, the dual fuel combustion engine comprises a sensor for sensing the quality of the combustion, or the quality of the supplied fuel.

Second Operation Mode

Returning now to the second operation mode, advantageous embodiments of said operation mode will be described in the following.

Advantageously, for the second operation mode, there may be provided a method of operating an internal combustion engine of the diesel-type, comprising a combustion chamber being at least partly delimited by a piston, a first fuel supply for a first fuel, said first fuel supply being located in or at the combustion chamber and/or in or at an inlet port thereof, and a second fuel supply for a second fuel, the method comprising the steps of:—pre-mixing said first fuel in said combustion chamber and/or in said inlet port, compressing the charge containing the first fuel to conditions that allow auto-ignition of the second fuel, performing a first injection of the second fuel into said combustion chamber to initiate auto-ignition of said second fuel for igniting said first fuel, thereby initiating conditions for pre-mixed flame propagation combustion of the first fuel.

Further, the second operation mode may advantageously comprise the step of:

performing at least one subsequent, preferably liquid, injection, said subsequent injection supplying additional kinetic energy into the combustion process to thereby enhance turbulence intensity and propagation speed of said flame and/or to enhance late mixing in the combustion chamber, so as to improve late oxidation during combustion of the remaining fuel.

The additional kinetic energy provided by the subsequent injection (or subsequent injections) may be used to create additional small-scale turbulence in the region of the flame in the combustion chamber, which in turn enhances the propagation speed of said flame. Accordingly, the flame front will develop faster and reach into the combustion chamber in shorter time than without such additional turbulence, resulting in a more favourable combustion chamber pressure development over time, resulting in turn in higher (fuel) efficiency of the engine and less risk for knock compared with conventional dual fuel combustion processes without this additional turbulence.

Alternatively, or in addition to a subsequent injection to create additional turbulence, a subsequent injection (or subsequent injections) may be used for enhancing late mixing in the combustion chamber so as to improve final oxidation during combustion. Such a subsequent injection may be referred to as a "post-injection". The purpose of the post-injection is, as the purpose of the previously described subsequent injections, to add kinetic energy to the combustion process. However, the kinetic energy added by the post-injection will not primarily be utilised as to increase the flame speed. Instead, the kinetic energy from the post-injection is supplied so as to create turbulence in the later stages of the combustion cycle and hence enhance late or global mixing of gases remaining in the combustion chamber for improving late oxidation during the combustion of the fuel.

The first injection of the second fuel is sufficient to initiate ignition and hence to initiate pre-mixed flame propagation combustion. In contrast, the purpose of the subsequent injection (or subsequent injections) (after said first injection of the second fuel) is to add kinetic energy creating additional small scale turbulence in the region of the propagating flame or enhancing global mixing of gases in the combustion chamber. Accordingly, the subsequent injections need not necessarily add any fuel to the combustion process. Any gaseous or liquid matter, which may transfer kinetic energy via an injection thereof and which does not disturb the combustion process, may be used.

It is preferred to inject a liquid for the subsequent injections, since the necessary quantity of supplied kinetic energy and the administration of the injections may generally be made easier to achieve with liquids than with injection of gaseous matter. In view of the above, any liquid which does not disturb the combustion process could be injected, such as e.g. water. It is to be understood however, that with injection of a liquid is meant that the substance is in its liquid phase at the precise moment of injection. Once injected, the liquid will, for typical conditions, transfer to gaseous phase with a rate depending on the combustion chamber conditions, the injection process and the properties of the liquid. Hence, even when the subsequent injections are liquid injections, a large fraction of the kinetic energy is transferred and a large fraction of the turbulence is created by impact of the injected substance while in its gaseous phase.

However, for practical purposes, it is preferred that the subsequent injection is an injection of a fuel. Most preferred, the subsequent liquid injection is of the same fuel as the first injection, that is, of the second fuel. As such, no additional constructive or engine, design arrangements for the subsequent injections are necessary.

Preferably, the amount of additional kinetic energy supplied by the at least one subsequent injection is variable.

Advantageously, the amount of additional kinetic energy supplied by these subsequent injections is variable by varying at least one of: the number of subsequent injections, the injection pressures of the subsequent injections, the durations of the subsequent injections, or the dwell time between subsequent injections. In this context it is to be understood that the amount of additional kinetic energy supplied may be varied between subsequent injections of the same combustion cycle, and/or be varied between subsequent injections belonging to different combustion cycles.

Advantageously, the amount of kinetic energy supplied by these subsequent injections is varied in accordance with feedback supplied from at least one sensor sensing at least one of: the combustion process, the fuels and their parameters as temperature, pressure, time, quality of fuel, etc. and/or the results of said combustion process including but not limited to the resulting chemical compounds produced by such combustion process and contained in the exhaust gas of the engine. The control of the at least one subsequent injection may then be performed using feedback from said sensor as input. Accordingly, the combustion process may be continuously surveyed and the subsequent injections continuously controlled to improve said combustion process. Advantageously, in a startup phase a first combustion cycle or a first few combustion cycles may be run using selected start parameters for the subsequent injection, whereafter the sensor is used for evaluating said first combustion cycle or the first few combustion cycles, and providing input for the adjustment of the subsequent injection for the following combustion cycles in the normal operational phase of the engine. Accordingly, the combustion process may be adapted for a specific situation. Moreover, this enables a more robust combustion process, since the subsequent injections may also be adapted if the conditions should vary during continuous operation of the engine.

As an alternative to initiating the first combustion cycle or the first few combustion cycles with selected start parameters for the subsequent injection, in the start-up phase the first combustion cycle or the first few combustion cycles could be run without any subsequent injection at all.

The sensor(s) may advantageously be sensor(s) for sensing for instance the quality of the supplied fuel, preferably for sensing the octane number. Such sensors could be provided e.g. in the fuel tank or fuel supply system.

Alternatively, in addition or in combination with such a fuel quality sensor, the method may use a sensor for sensing the quality of the combustion. Various such sensors may be applicable. One known type of sensor is a so called knock-sensor. Preferably, a device for sensing the combustion chamber pressure could be used in combination with a method for a fast evaluation (on a cycle-to-cycle basis) of the heat release.

Regarding the second aspect of the invention, and concerning said second operation mode, there may be provided a dual fuel internal combustion engine of the diesel-type, comprising:

a combustion chamber being at least partly delimited by a piston, a first fuel supply for a first fuel, said first fuel supply being located in or at the combustion chamber and/or in or at an inlet port thereof, a second fuel supply for a second fuel, said first fuel being pre-mixed in said combustion chamber and/or said inlet port,—at least one device for compressing the charge containing the first fuel to conditions that allow auto-ignition of the second fuel, at least one injector device for performing a first injection of the second fuel into said combustion chamber to initiate auto-ignition of said second fuel for igniting said first fuel, thereby initiating conditions for pre-mixed flame propagation combustion of the first fuel.

Advantageously, the dual fuel combustion engine further comprises at least one injector device for performing at least one subsequent (preferably liquid) injection, so as to supply additional kinetic energy into the combustion process to thereby enhance turbulence intensity and propagation speed of said flame and/or to enhance late mixing in the combustion chamber, so as to improve late oxidation during combustion of the remaining fuel.

Preferably, the dual fuel combustion engine comprises at least one sensor for determining the operation mode, wherein output from said sensor is used to control the amount or quantity of the first injection of the second fuel, and/or the timing of said first injection of the second fuel.

Preferably, the dual fuel combustion engine comprises at least one sensor for providing feedback from the combustion process, wherein the output from said sensor is used for said control of the at least one subsequent (preferably liquid) injection.

Preferably, the dual fuel combustion engine comprises a sensor for sensing the quality of the combustion, or the quality of the supplied fuel.

It should be realised that alternatives and advantages as described above in relation to the various methods applies equally to the various dual fuel combustion engines according to aspects of the invention.

BRIEF DESCRIPTION OF THE DRAWINGS

The invention will now be described in more detail by non-limiting examples as described in the following, and with reference to the accompanying drawings wherein.

DETAILED DESCRIPTION

Figure 1A:
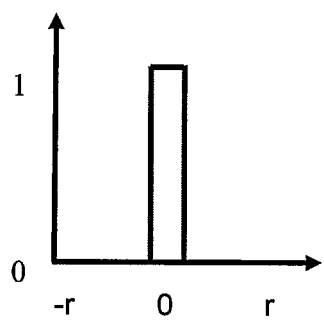
FIGS. 1a to 1c provide a schematic illustration of the combustion process in the combustion chamber in a first operation mode ("homogeneous combustion mode")
Figure 1B:
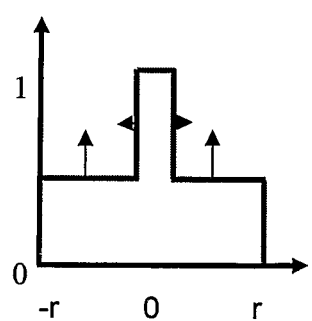
Figure 1C:
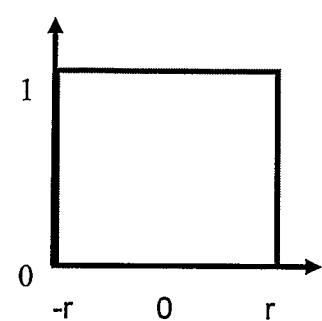

FIGS. 1a to 1c provide a (simplified) schematic illustration of the combustion process in the combustion chamber for the first operation mode, that is, for the homogeneous combustion mode. The horizontal axis depicts the spatial position in the combustion chamber, where 0 denotes the centre axis of the chamber, and +/−r the transversal end walls thereof. The vertical axis illustrates the degree of completeness of the local combustion process where zero corresponds to no local combustion and one corresponds to complete local combustion.

FIG. 1a illustrates the situation at ignition of the first operation mode. For illustration and simplicity purposes the combustion process is described to take place in one spatial dimension (the real combustion chamber has a complicated three-dimensional geometry). Preferably, ignition and early combustion takes place in the central parts of the combustion chamber.

The subsequent combustion propagation is illustrated by the arrows in FIGS. 1a and 1b. As illustrated in FIG. 1b, in this process, the flame propagates only marginally before auto-ignition takes place in all parts of the combustion chamber containing unburned fuel. Finally, as in FIG. 1c, the combustion is complete in all parts of the combustion chamber.

Hence, FIGS. 1a to 1c are intended to illustrate the homogeneous combustion-type of combustion process which constitutes the first operation mode selectable by the method of an aspect of the invention.

Figure 2A:
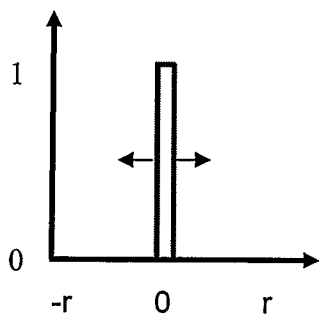
FIGS. 2a to 2c provide a schematic illustration of the flame propagation in the combustion chamber in a second operation mode ("flame propagation mode")
Figure 2B:
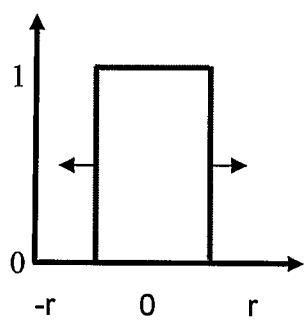
Figure 2C:
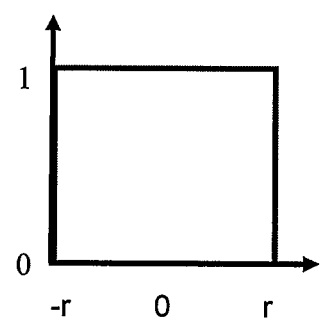

FIGS. 2a to 2c, illustrate (in a simplified manner) a schematic illustration of the combustion process in the combustion chamber for the second operation mode, being referred to as flame propagation mode (typical for engines of the gasoline-type).

The horizontal axis depicts the spatial position in the combustion chamber, where 0 denotes the centre axis of the chamber, and +/−r the transversal end walls thereof. The vertical axis illustrates the degree of completeness of the local combustion process where zero corresponds to no local combustion and one corresponds to complete local combustion.

FIG. 2a illustrates the situation at ignition of the second operation mode. For illustration and simplicity purposes the combustion process is described to take place in one spatial dimension (the real combustion chamber has a complicated three-dimensional geometry). Preferably, ignition and early combustion takes place in the central parts of the combustion chamber.

As can be seen in FIG. 2a, the situation at ignition is similar to the one in FIG. 1a.

Preferably, ignition and early combustion take place in the centre of the combustion chamber. The subsequent flame propagation is illustrated by the arrows in FIGS. 2a and 2b. Once the flame has propagated across a specific position in the combustion chamber the degree of completeness of the local combustion process goes from zero (no local combustion) to one (complete local combustion). Eventually, as illustrated in FIG. 2c, the combustion is complete in all parts of the combustion chamber as the flame has propagated all the way to the transversal walls of the chamber.

Homogeneous ignition and combustion is sometimes referred to as a type of controlled advantageous auto-ignition process in contrast to uncontrolled auto-ignition that may cause disadvantageous knock. Typically, when using the homogeneous combustion mode as in FIGS. 1a to 1c, complete combustion in all parts of the combustion chamber is reached quicker than in the pre-mixed flame propagation combustion example of FIGS. 2a to 2c.

In accordance with the present invention, a method of operating a dual fuel internal combustion engine of the diesel-type has been realised, which internal combustion engine comprises a combustion chamber being at least partly delimited by a piston, a first fuel supply for a first fuel, said first fuel supply being located in or at the combustion chamber and/or in or at an inlet port thereof, and a second fuel supply for a second fuel, and wherein said method of operation of said internal combustion engine may be switched between a first operation mode which is distinguished by homogeneous ignition and combustion of the remaining fuel (a "homogeneous combustion mode") and a second operation mode which is distinguished by pre-mixed flame propagation combustion of the remaining fuel (a "flame propagation mode").

The switching between operation modes is accomplished by adjusting the amount of second fuel in a first injection of the second fuel, and/or the timing of the first injection of the second fuel, so as to control the combustion chamber temperature and pressure after auto-ignition of the second fuel such that a selection between said first and second operation modes is achieved.

For example, for remaining in a flame propagation mode, the first (ignition) injection of the second fuel should be made using a relatively small amount of fuel. If the amount of second fuel in said first injection of the second fuel is increased to a threshold amount or exceeding it towards even larger amounts of second fuel, this alters the combustion process in the combustion chamber such that a homogeneous combustion mode is reached. Likewise, if running the engine in a homogeneous combustion mode, decreasing the amount of second fuel in said first (ignition) injection of the second fuel to a threshold amount or passing it towards even lower amounts of second fuel alters the combustion process in the combustion chamber such that the flame propagation mode is reached. Hence, the amount of the second fuel in said first injection of the second fuel may be used as a switch between operation modes.

Figure 3:
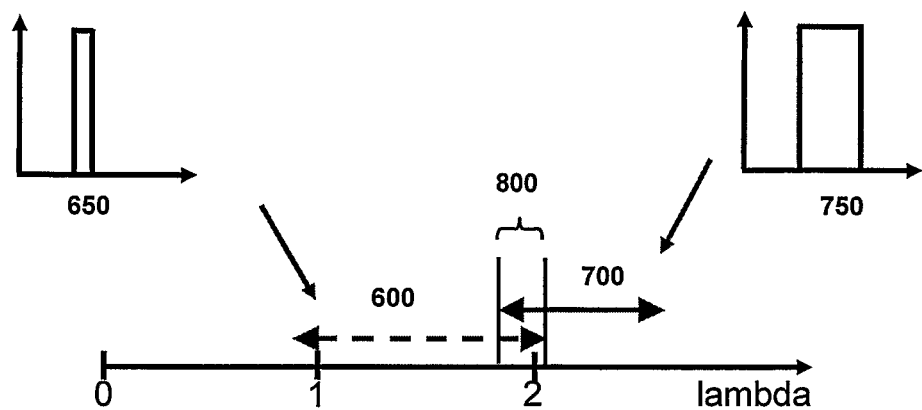
FIG. 3 provides a schematic illustration of the region of operation for the first and the second operation mode as depicted in FIGS. 1a to 1c and FIGS. 2a to 2c.

FIG. 3 illustrates schematically the switching between operation modes in relation to values of lambda, where lambda is the normalised air to fuel ratio.

In FIG. 3, the second operation mode (flame propagation mode) will prevail in a range 600 of relatively low lambda values, with values ranging from approximately lambda=1 close to lambda=2. In a range 700 of higher lambda values, with values greater than lambda=2, the first operation mode (homogeneous combustion mode) will prevail.

However, in a region close to lambda=2, both operation modes are possible. This region is illustrated as the overlap region 800 of the lower lambda range 600 and the higher lambda range 700. In the overlap region 800, switching between the operation modes is possible. If a relatively small amount of second fuel is injected (as indicated in the diagram by injection 650), when the lambda value is in this overlap region 800, the second operation mode, i.e. the flame propagation mode, will be established. If instead a relatively large amount of second fuel is injected (as indicated in the diagram by injection 750) when the lambda value is in the overlap region 800, the first operation mode, i.e. the homogeneous combustion mode, will be established.

Figure 4:
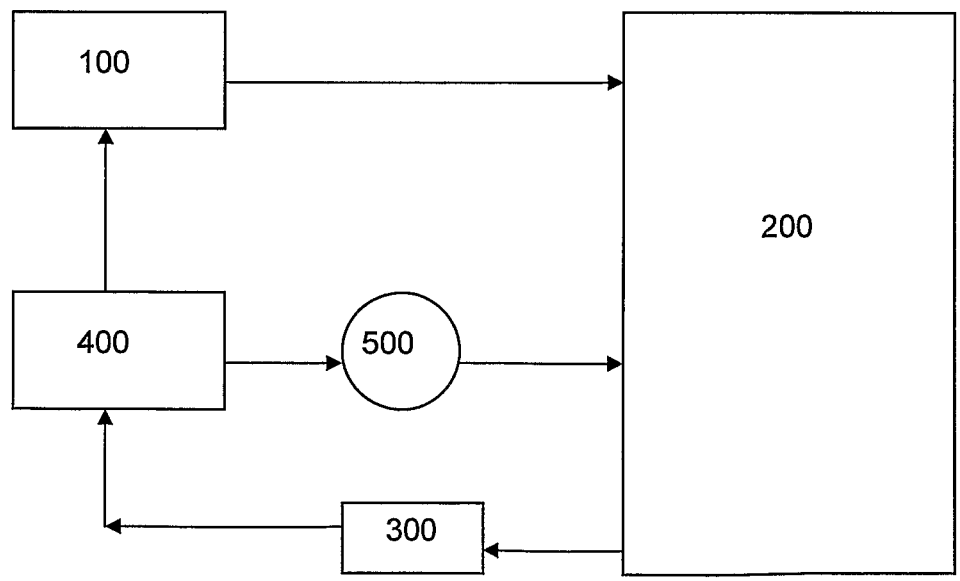
FIG. 4 provides a schematic illustration of a method and a dual fuel combustion engine in accordance with a preferred embodiment of the invention.

FIG. 4 is a block diagram schematically illustrating the function of a method and a dual fuel internal combustion engine in accordance with an aspect of the invention.

A controller 400 is arranged to control combustion cycle initiation 100 and optionally any subsequent injections 500 for a combustion process 200 of a dual fuel internal combustion engine. The combustion cycle initiation 100, which includes the injection of the first fuel and the first injection of the second fuel into the combustion chamber of the internal combustion engine to initiate auto-ignition of said second fuel, and the (optional) subsequent injections 500 affect the combustion process 200. Hence, the combustion cycle initiation 100 may be set to control the first injection of the second fuel so as to select between the first and the second operation mode of the engine. The combustion process 200 may be evaluated using one or more sensors 300 as described above. The sensors 300 provide feedback to the controller 400 which may adjust the combustion cycle initiation and/or the subsequent injections 500 in accordance with said feedback.

In the illustrated example, one of the sensors 300 is depicted that provides a measure of the function of the combustion process. However, as described above, a sensor or sensors 300 could also be provided for sensing CO or HC concentrations in the engine exhaust gas or other relevant parameters of the combustion process.

Moreover, it shall be understood that a plurality of sensors 300 may be arranged and evaluated for control of the subsequent injections 500.

According to a preferred variant of a method and a dual fuel combustion engine of this invention the operation mode of the combustion engine can be switched between two examples of operation modes, which will be described below. However, it will be understood that the two examples of operation modes as described below may also be used in combination with other operation modes.

In the following, an operation method, which may be used as the first operation mode (the homogeneous combustion mode) in a method in accordance with an aspect of the invention, will be described, wherein subsequent injections are used. However, it will be understood that although being particularly advantageous, the present invention is not restricted to this particular embodiment of a first operation mode (the homogeneous combustion mode), but could be used with many variants of first operation modes of the homogeneous combustion type.

In the embodiment of a first operation mode (the homogeneous combustion mode), the operation mode comprises a method of operating a dual fuel internal combustion engine of the diesel-type, comprising a combustion chamber, being at least partly delimited by a piston, a first fuel supply for a first fuel, said first fuel supply being located in or at the combustion chamber and/or in or at an inlet port thereof, and a second fuel supply for a second fuel, the method comprising the steps of:

pre-mixing said first fuel in said combustion chamber and/or in said inlet port, compressing the charge containing the first fuel to conditions close to homogeneous charge compression ignition of said first fuel, performing a first injection of the second fuel into said combustion chamber to initiate auto-ignition of said second fuel and subsequently said first fuel, and advantageously, performing at least one subsequent (preferably liquid) injection, said subsequent injection supplying additional kinetic energy into the combustion process to thereby enhance late mixing in the combustion chamber, so as to improve late oxidation during combustion.

Figure 5:
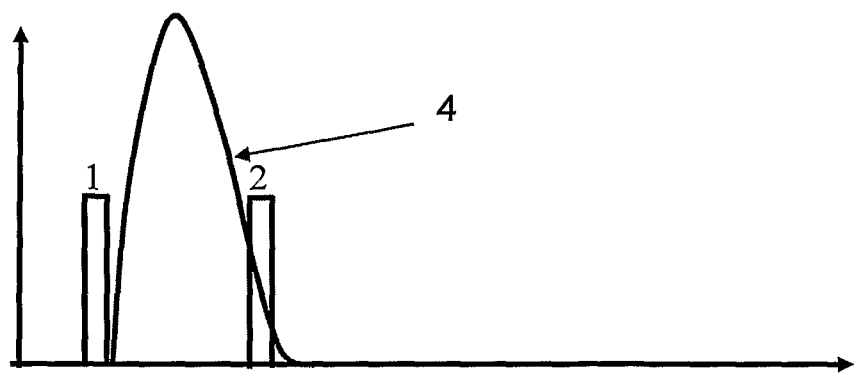
FIG. 5 provides a schematic illustration of the rate of heat release curve as a function of time and in relation to the injections in an embodiment of the first operation mode.

FIG. 5 is intended to schematically illustrate (in a simplified manner) the timing of the first injection of the second fuel and of the subsequent injections in relation to the rate of heat release. In FIG. 5, the horizontal dimension represents time, or crank angle interval, during a combustion cycle. The vertical dimension mirrors (i) the rate of heat release of the combustion process when relating to the rate of heat release curve 4, and (ii) the rate of injected fuel mass when relating to the injections 1, 2.

The first of the injections 1, 2 (injection 1) is the "first injection" of the second fuel used for auto-igniting the second fuel to initiate auto-ignition of the first fuel (i.e. the charge containing the first fuel being previously compressed to conditions close to homogeneous charge compression ignition of said first fuel). The first injection 1 of the second fuel hence contributes to triggering the start of the combustion process. Accordingly, the rate of heat release rises quickly immediately after the first injection 1.

The following injection is a "subsequent injection" 2, which supplies additional kinetic energy to the combustion process so as to enhance late mixing in the combustion chamber so as to improve final (i.e. late) oxidation during combustion. Accordingly, the subsequent injections 2 may, but need not be of the second fuel. As illustrated in FIG. 5, the subsequent injection 2 takes place relatively late in the combustion process. In particular, in this case, the subsequent injection is made after the peak of the rate of heat release curve 4. The selected number n of "subsequent" injection pulses 2 in FIG. 5 to n=1 is only exemplary, i.e. the number of such injection pulses may be varied dependent on the circumstances of the individual case or the individual situation and can be any natural number n equal to or greater than 1, for instance n=1, 2, 3, 4, 5, 6, 7, 8, 9, 10 and so on.

Since the object of the subsequent injection 2 is to enhance late mixing in the combustion chamber, it may generally be desired to perform the subsequent injection 2 after the peak of the rate of heat release curve 4, when the heat release has started to decline. The object of the subsequent injection 2 is to enhance late mixing of fuel initially trapped in crevice volumes or of compounds that initially only partially oxidase in the combustion chamber, due to wall cooling or other effects, so as to improve late oxidation during combustion. Hence, the result of the subsequent injection may be a slight increase in heat release.

It should be appreciated that the number and exact timing of the subsequent injections 2 may be varied. As stated above, there should be at least one subsequent injection 2. Advantageously, there may be at least two subsequent injections. Preferably, the number of subsequent injections is less than ten, more preferred less than five. It is believed that between 1 and 5, preferably between 1 and 3, subsequent injections may be particularly useful.

Moreover, in FIG. 5 the illustrated first injection 1 and the subsequent injection 2 have the same height and duration, i.e. they all include the same amount of fuel. This is naturally not necessary. Instead, the appearance of the injections may be varied as set out above in. The subsequent injections 2 may differ from the first injection 1. Moreover, in the case of a plurality of subsequent injections 2 being used, the subsequent injections 2 need not be identical either.

In the following, there will be described a method of operating a dual fuel internal combustion engine of the diesel-type, being an embodiment of a second operation mode (flame propagation mode) which may be used in the context of the present invention. However, although particularly advantageous, it will be understood that the present invention is not limited to this embodiment of a second operation mode, but may be used with other variants of second operation modes being distinguished by pre-mixed flame propagation.

In the embodiment of a second operation mode (flame propagation mode), there is provided a method for operating a combustion engine of the diesel-type, comprising a combustion chamber being at least partly delimited by a piston, a first fuel supply for a first fuel, said first fuel supply being located in or at the combustion chamber or in or at an inlet port thereof, and a second fuel supply for a second fuel, the method comprising the steps of:

pre-mixing said first fuel in said combustion chamber and/or in said inlet port, compressing the charge containing the first fuel to conditions that allow auto-ignition of the second fuel, performing a first injection of the second fuel in said combustion chamber to initiate auto-ignition of said second fuel for igniting said first fuel, thereby initiating conditions for pre-mixed flame propagation combustion of the first fuel.

Advantageously, the method further comprises performing at least one subsequent (preferably liquid) injection, said subsequent injection supplying additional kinetic energy into the combustion process to thereby enhance turbulence intensity and propagation speed of said flame and/or enhance late mixing in the combustion chamber, so as to improve late oxidation during combustion of the remaining fuel.

Figure 6:
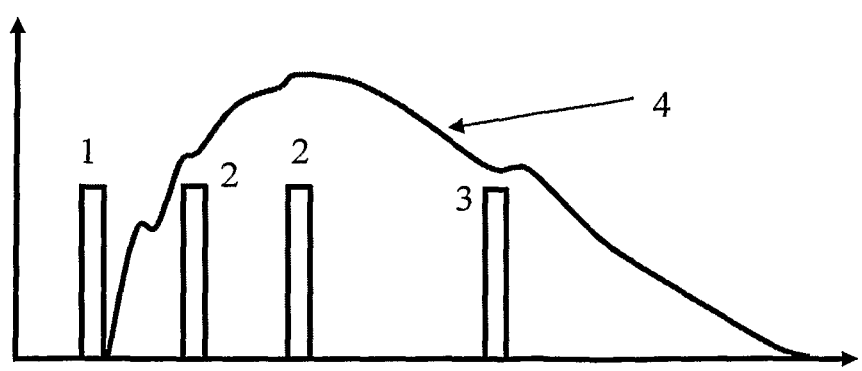
FIG. 6 provides a schematic illustration of the rate of heat release curve as a function of time and in relation to the injections in an embodiment of the second operation mode.

FIG. 6 is intended to schematically illustrate (in a simplified manner) the timing of the first injection of the second fuel and the subsequent injections in relation to the rate of heat release. In FIG. 6, the horizontal dimension represents time, or crank angle interval, during a combustion cycle. The vertical dimension mirrors (i) the rate of heat release of the combustion process when relating to the rate of heat release curve 4, and (ii) the rate of injected fuel mass when relating to the injections 1, 2, 3.

The first of the injections 1, 2, 3 (injection 1) is the "first injection" of the second fuel which is used for igniting the first fuel by injection and auto-ignition of the second fuel. The first injection 1 hence contributes to triggering the propagation of the flame. Accordingly, the rate of heat release rises quickly soon after the first injection 1. A fraction of the early heat release corresponds to the combustion of the second fuel injected in the first injection 1.

The two following injections are "subsequent injections" 2, which supply additional kinetic energy to the combustion process so as to enhance the turbulence intensity and the propagation speed of the flame. Accordingly, the subsequent injections may, but need not be, of the second fuel. As illustrated in FIG. 6, the subsequent injections 2 take place during the combustion process. In particular, in this case, the subsequent injections are made before the peak of the rate of heat release curve 4. The selected number n of "subsequent" injection pulses to n=2 (denoted 2 in FIG. 6) is only exemplary, i.e. the number of such injection pulses may be varied dependent on the circumstances of the individual case or the individual situation and can be any natural number n equal to or greater than 1, for instance n=1, 2, 3, 4, 5, 6, 7, 8, 9, 10 and so on.

Since the object of the subsequent injections 2 is to increase turbulence intensity so as to speed up the flame propagation, it may be generally desired to perform the subsequent injections before the flame has propagated to the combustion chamber walls.

In the illustrated example, another subsequent injection 3, being of the post-injection-type, is performed after the peak of the heat release curve 4, when the heat release has started to decline. The object of the post-injection 3 is to enhance late mixing of fuel initially trapped in crevice volumes or of compounds that only partially oxidise in the combustion chamber, due to wall cooling or other effects, so as to improve late oxidation during combustion. Hence, the result of the post-injection 3 is a slight increase in heat release, seen as a "bump" in the otherwise declining rate of heat release curve 4.

It should be appreciated that the number and exact timing of the subsequent injections may be varied. As stated above, there should be at least one subsequent injection.

Advantageously, there may be at least two subsequent injections. Preferably, the number of subsequent injections is less than 10. It is believed that between 1 and 10, preferably between 2 and 7, subsequent injections may be particularly useful.

Moreover, in FIG. 6 the illustrated first injection 1, subsequent injections 2, 3 (the initial two subsequent injections 2 and the post-injection type subsequent injection 3) all have the same height and duration, i.e. they all include the same amount of fuel. This is naturally not necessary. Instead, the appearance of the injections may be varied as set out above. The initial subsequent injections 2, for instance, may differ from the first injection 1 and/or the final subsequent injection 3 (the post-injection). Moreover, the initial subsequent injections 2 need not be identical either.

It is to be understood that many embodiments and alternatives may be encompassed by the enclosed claims. Moreover, although the method relates to a method of operating an internal combustion engine of the diesel-type using two fuels, it is understood that such a method may be periodically used in a diesel-type engine which may, during other periods, also run on a single fuel. If a single fuel is used in the engine, some other methods of operating the internal combustion engine may be used. Hence, the method proposed herein may be one out of a number of operation methods used in one and the same engine.

The invention claimed is:

1. A method of selecting between two operation modes in a dual fuel internal combustion engine of the diesel-type, comprising a combustion chamber being at least partly delimited by a piston, a first fuel supply for a first fuel, the first fuel supply being located at least one of in and at at least one of the combustion chamber and an inlet port of the combustion chamber, and a second fuel supply for a second fuel, the engine having two different operation modes, both operation modes comprising the steps of:
pre-mixing the first fuel in the at least one of the combustion chamber and the inlet port,
compressing the charge containing the first fuel to conditions that allow auto ignition or the second fuel,
performing a first injection of the second fuel into the combustion chamber to initiate auto-ignition of the second fuel, thereby initiating conditions for combustion of the fuel remaining in the combustion chamber after auto-ignition of the second fuel, wherein
the first operation mode is distinguished by homogenous ignition and combustion of the remaining fuel,
the second operation mode is distinguished by pre-mixed flame propagation combustion of the remaining fuel,
the method further comprising the step of:
adjusting the amount of the second fuel injected in the first injection of the second fuel, and/or the timing of said the first injection of the second fuel, so as to control the combustion chamber temperature and pressure after auto-ignition of the second fuel such that selection between the first and second operation modes is achieved, wherein
the second operation mode comprises:
performing the first injection of the second fuel into the combustion chamber to initiate auto-ignition of the second fuel for igniting the first fuel, thereby initiating conditions for pre-mixed flame propagation combustion of the first fuel, and
performing at least one subsequent injection, the subsequent injection supplying additional kinetic energy into the combustion process to thereby enhance turbulence intensity and propagation speed of the flame.

2. Method according to claim 1, wherein selection of the first operation mode is performed by at least one of increasing the amount of second fuel in the first injection of the second fuel, in particular by injecting an amount of the second fuel, in the first injection of the second fuel, equal to or larger than a predetermined threshold amount, and adjusting the timing of the first injection of the second fuel so that auto-ignition of the second fuel occurs when the piston is close to its top dead position in the combustion chamber.

3. Method according to claim 1, wherein selection of the second operation mode is performed by at least one of decreasing the amount of second fuel in the first injection of the second fuel, in particular by injecting an amount of the second fuel, in the first injection of the second fuel, less than a predetermined threshold amount, and adjusting the timing of the injection of the second fuel so that auto-ignition of the second fuel occurs when the piston is at a sufficient distance from its top dead position in the combustion chamber.

4. Method according to claim 1, wherein switching between the first and second operation mode is performed by at least one of adjusting the amount of second fuel injected and the timing of the first injection at a lambda value (normalised air/fuel ratio) in the combustion chamber being between 1 and 3.

5. Method according to claim 1, wherein the first operation mode comprises:
pre-mixing the first fuel at least one of in and at at least one of combustion chamber and the inlet port,
compressing the charge containing the first fuel to conditions close to homogenous charge compression ignition of said the first fuel,
performing the first injection of the second fuel into the combustion chamber to initiate auto-ignition of the second fuel and subsequently the first fuel.

6. Method according to claim 1, further comprising the step of:
performing at least one subsequent injection, the subsequent injection supplying additional kinetic energy into the combustion process to thereby enhance late mixing in the combustion chamber, so as to improve late oxidation during combustion.

7. A method according to claim 1, wherein the subsequent injection is an injection of a liquid.

8. A method according to claim 1, wherein at least one of the first fuel is a fuel with an octane number, greater than 90 and the second fuel is a fuel with cetane number greater than 40.

9. A method according to claim 1, wherein the first fuel is a gaseous fuel.

10. A method according to claim 1, wherein the second fuel is a liquid fuel.

11. A method according to claim 1, wherein the first fuel is pre-mixed with at least one of air and recycled exhaust gas.

12. A dual fuel internal combustion engine of the diesel-type comprising:
a combustion chamber being at least partly delimited by a piston,
a first fuel supply for a first fuel, first fuel supply being located at least one of in and at at least one of the combustion chamber and an inlet port of the combustion chamber,
a second fuel supply for a second fuel, the first fuel being pre-mixed in the at least one of the combustion chamber and the inlet port, at least one device for compressing tile charge containing file first fuel to conditions that allow auto-ignition of the second fuel, at least one injector device for performing a first injection of the second fuel into the combustion chamber to initiate auto-ignition of the second fuel, thereby initiating conditions for combustion of the fuel remaining in the combustion chamber after auto-ignition of the second fuel, wherein the first operation mode is distinguished by homogenous ignition and combustion of the remaining fuel, the second operation mode is distinguished by pre-mixed flame propagation combustion of the remaining fuel, at least one injector device for adjusting the amount of the second fuel injected in the first injection of the second fuel, and the timing of the first injection of the second fuel, so as to control the combustion chamber temperature and pressure after auto-ignition of the second fuel such that selection between the first and second operation modes is achieved, wherein the injector device for performing of the first injection of the second fuel is adapted to, in a second operation mode of the engine, preform the first injection of the second fuel into the combustion chamber to initiate auto-ignition of the second fuel for igniting the first fuel in the combustion chamber, thereby initiating conditions for pre-mixed flame propagation combustion of the first fuel, and the at least one injector device for performing of the first injection of the second fuel is adapted to perform at least one subsequent injection, so as to supply additional kinetic energy into the combustion process, to, when the engine is in the second operation mode, thereby enhance the turbulence intensity and flame propagation speed.

13. A dual fuel engine according to claim 12, wherein the at least one injector device for performing of the first injection of the second fuel is adapted to, in a first operation mode of the engine, perform the first injection of the second fuel into the combustion chamber to initiate auto-ignition of the second fuel and subsequently the first fuel in the combustion chamber, thereby initiating conditions for homogeneous ignition and combustion of the first fuel.

14. A dual fuel engine according to claim 12, wherein the at least one injector device for performing of the first injection of the second fuel is adapted to perform at least one subsequent injection, so as to supply additional kinetic energy into the combustion process to, when the engine is in the first or second operation mode, thereby enhance late mixing in the combustion chamber, so as to improve late oxidation during the combustion process.

* * * * *